United States Patent
Song et al.

(10) Patent No.: US 7,817,735 B2
(45) Date of Patent: Oct. 19, 2010

(54) DEVICE AND METHOD OF PERFORMING CHANNEL ESTIMATION FOR OFDM-BASED WIRELESS COMMUNICATION SYSTEM

(75) Inventors: Kee-Bong Song, Santa Clara, CA (US); Chaohuang Zeng, Sunnyvale, CA (US); Won-Joon Choi, Cupertino, CA (US)

(73) Assignee: Amicus Wireless Technology Ltd. (KY)

( * ) Notice: Subject to any disclaimer, the term of this patent is extended or adjusted under 35 U.S.C. 154(b) by 783 days.

(21) Appl. No.: 11/621,960

(22) Filed: Jan. 10, 2007

(65) Prior Publication Data

US 2007/0160159 A1    Jul. 12, 2007

Related U.S. Application Data

(60) Provisional application No. 60/757,910, filed on Jan. 11, 2006.

(51) Int. Cl.
| | |
|---|---|
| H04K 1/10 | (2006.01) |
| H01L 27/28 | (2006.01) |
| H04L 1/02 | (2006.01) |
| H04B 7/02 | (2006.01) |
| H03H 7/30 | (2006.01) |
| H03H 7/40 | (2006.01) |
| H03K 5/159 | (2006.01) |
| H04B 1/04 | (2006.01) |

(52) U.S. Cl. .............. 375/260; 375/232; 375/267; 455/105

(58) Field of Classification Search .............. 375/232, 375/260, 267; 455/105
See application file for complete search history.

(56) References Cited

U.S. PATENT DOCUMENTS

| | | | |
|---|---|---|---|
| 5,924,499 A | 7/1999 | Birchak et al. | |
| 2003/0043887 A1 | 3/2003 | Hudson | |
| 2004/0264561 A1* | 12/2004 | Alexander et al. | 375/232 |
| 2005/0094740 A1* | 5/2005 | Borran et al. | 375/267 |
| 2005/0113041 A1* | 5/2005 | Polley et al. | 455/105 |
| 2005/0152314 A1 | 7/2005 | Sun et al. | |
| 2005/0163257 A1 | 7/2005 | Keerthi | |
| 2005/0176436 A1 | 8/2005 | Mantravadi et al. | |
| 2006/0203710 A1 | 9/2006 | Mukkavilli et al. | |
| 2007/0297522 A1* | 12/2007 | Baggen et al. | 375/260 |
| 2009/0122887 A1* | 5/2009 | Li et al. | 375/260 |

* cited by examiner

*Primary Examiner*—David C Payne
*Assistant Examiner*—Erin M File
(74) *Attorney, Agent, or Firm*—Thomas H. Ham; Wilson & Ham

(57) ABSTRACT

A device and method of performing channel estimation for an OFDM-based wireless communication system performs a Least Square interpolation with a statistical channel profile consideration on pilot channel estimates to derive data channel estimates at data subcarrier locations.

16 Claims, 5 Drawing Sheets

DEVICE AND METHOD OF PERFORMING CHANNEL ESTIMATION FOR OFDM-BASED WIRELESS COMMUNICATION SYSTEM

CROSS REFERENCE TO RELATED APPLICATION

This application is entitled to the benefit of U.S. Provisional Patent Application Ser. No. 60/757,910 filed on Jan. 11, 2006, which is incorporated herein by reference.

BACKGROUND OF THE INVENTION

Orthogonal Frequency Division Multiple Access (OFDMA) technology is getting very popular in modern communication systems since the OFDMA technology can efficiently support multiple mobile stations with limited bandwidth and easily provide Quality of Service (QoS). The OFDMA technology is a multiple access version of orthogonal frequency-division multiplexing (OFDM). OFDM is a modulation technique for data transmission based on frequency-division multiplexing (FDM), which uses different frequency channels to transmit multiple streams of data. In OFDM systems, a wide channel is divided into multiple narrow-band subcarriers, which allow orthogonal modulated streams of data to be transmitted in parallel on the subcarriers.

In OFDMA systems, multiple subscribers can simultaneously use different subcarriers for signal transmission. Thus, in an OFDMA system, multiple data bursts can be transmitted from a base station to multiple mobile stations in the same time frame but allocated in different frequency subcarriers. Consequently, an OFDMA system can support multiple mobile stations using different subcarriers.

Since OFMDA systems are wireless communication systems, the transmitted signals experience multi-path fading and delay across the system bandwidth due to what is commonly referred to as signal channels. In order to compensate for the effects of these signal channels, OFDMA receivers perform channel estimations using pilot signals embedded in the transmitted signals. Since the pilot signals are known signals, channel estimates for the pilot signals can be derived. Using the channel estimates for the pilot signals, channel estimates for data signals can be extracted by interpolation. If there is significant error in the resulting channel estimates, the received data will be erroneously decoded. This is especially true for higher-order quadrature amplitude modulation (QAM), such as 16-QAM and 64-QAM, which is used to transmit high data rate signals.

Thus, there is a need for a device and method for performing channel estimation for an OFDM-based wireless communication system such that errors in resulting channel estimates are minimized.

SUMMARY OF THE INVENTION

A device and method of performing channel estimation for an OFDM-based wireless communication system performs a Least Square interpolation with a statistical channel profile consideration on pilot channel estimates to derive data channel estimates at data subcarrier locations. The statistical channel profile consideration minimizes errors in the data channel estimates resulting from the Least Square interpolation of the pilot channel estimates, which decreases the potential for decoding errors.

A channel estimation device in accordance with an embodiment of the invention comprises a pilot channel estimator and a data channel estimator. The pilot channel estimator is configured to compute pilot channel estimates at pilot subcarrier locations for pilot signals of an incoming OFDM-based signal. The data channel estimator is configured to perform a Least Square interpolation with a statistical channel profile consideration on the pilot channel estimates to derive data channel estimates at data subcarrier locations for data signals of the incoming OFDM-based signal.

A method for performing channel estimation for an OFDM-based wireless communication system in accordance with an embodiment of the invention comprises receiving an incoming OFDM-based signal including data and pilot signals, computing pilot channel estimates at pilot subcarrier locations for the pilot signals, and performing a Least Square interpolation with a statistical channel profile consideration on the pilot channel estimates to derive data channel estimates at data subcarrier locations for the data signals.

Other aspects and advantages of the present invention will become apparent from the following detailed description, taken in conjunction with the accompanying drawings, illustrated by way of example of the principles of the invention.

DETAILED DESCRIPTION

Figure 1:
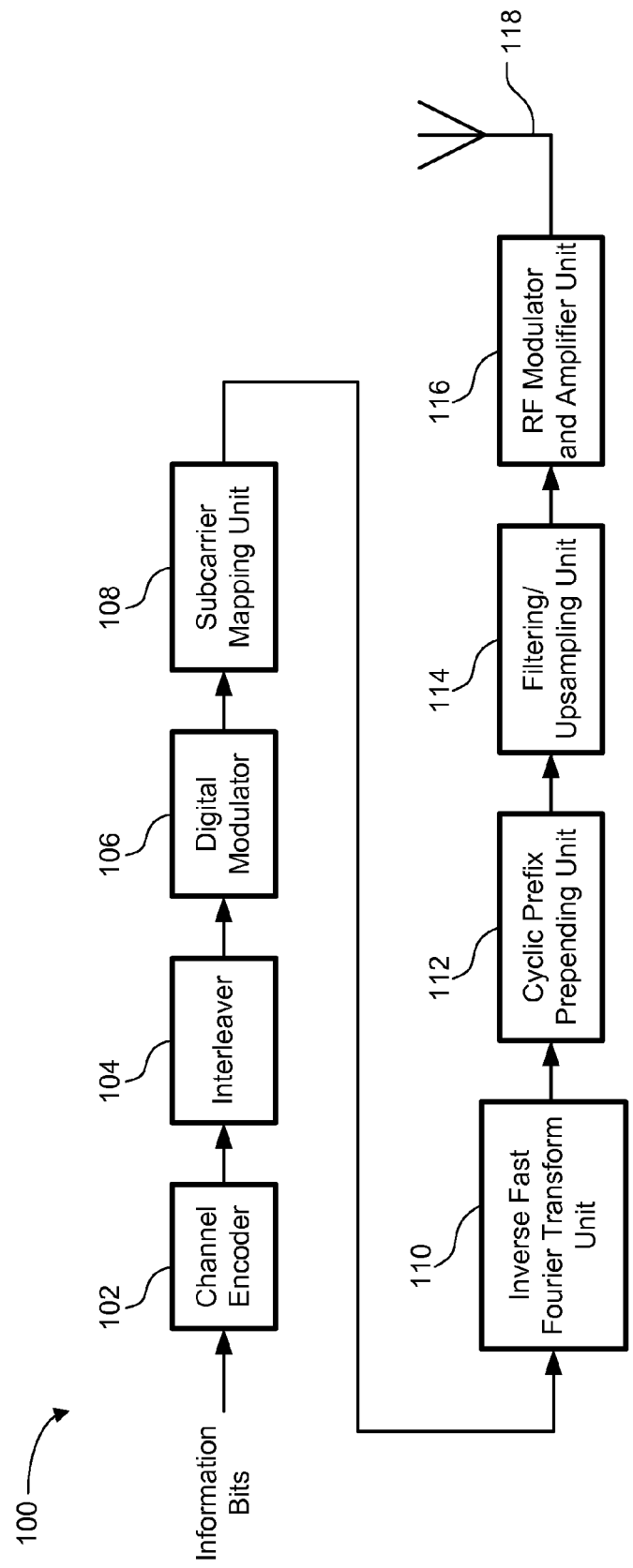
FIG. 1 is a block diagram of an Orthogonal Frequency Division Multiple Access (OFDMA) transmitter in accordance with an embodiment of the invention.

With reference to FIG. 1, an Orthogonal Frequency Division Multiple Access (OFDMA) transmitter 100 in accordance with an embodiment of the invention is described. The OFDMA transmitter 100 is part of an OFDMA wireless communication system. As an example, the OFDMA transmitter 100 may be a component of a base station of an OFDMA wireless communication system.

As shown in FIG. 1, the OFDMA transmitter 100 includes a channel encoder 102, an interleaver 104, a digital modulator 106, a subcarrier mapping unit 108, an inverse fast Fourier transform (IFFT) unit 110, a cyclic prefix prepending unit 112, a filtering/upsampling unit 114, a radio frequency (RF) modulator and amplifier unit 116 and a transmit antenna 118. The channel encoder 102 is configured to encode information bits using an encoding scheme, such as convolutional coding, turbo coding, block coding or other well-known forward error correction (FEC) encoding scheme. The interleaver 104 is configured to interleave the encoded bits to provide additional protection against burst errors due to deep channel fading. The digital modulator 106 is configured to map the encoded and interleaved bits into modulation symbols of a modulation scheme, such as quadrature phase shift keying (QPSK), M-ary quadrature amplitude modulation (M-QAM) or M-ary phase shift keying (M-PSK). The subcarrier mapping unit 108 is configured to map the modulation symbols into data subcarriers in the frequency domain.

The number of data subcarriers in one OFDMA symbol depends on the size of fast Fourier transform (FFT) being used, the number of guard subcarriers and the number of pilot subcarriers. A group of N subcarriers, which includes data subcarriers, DC/guard subcarriers and pilot subcarriers, forms a single OFDMA symbol, where N is the FFT size.

The IFFT unit 110 is configured to transform the N subcarriers into time-domain by IFFT so that the OFDMA symbols are suitable for sending through wireless propagation environment. For each OFDMA symbol, the cyclic prefix prepending unit 112 is configured to prepend the last M samples at the beginning of each symbol to generate cyclic prefix (CP). This CP serves as a guard period to eliminate the inter-symbol-interference (ISI) between OFDMA symbols in multi-path fading environment. The filtering/upsampling unit 114 is configured to filter and up-sample the CP-added OFDMA symbols for the purpose of pulse shaping. The RF modulator and amplifier unit 116 is configured to convert the symbols to an RF signal and to amplify the signal for transmission through the wireless fading environment via the transmit antenna 118.

Figure 2:
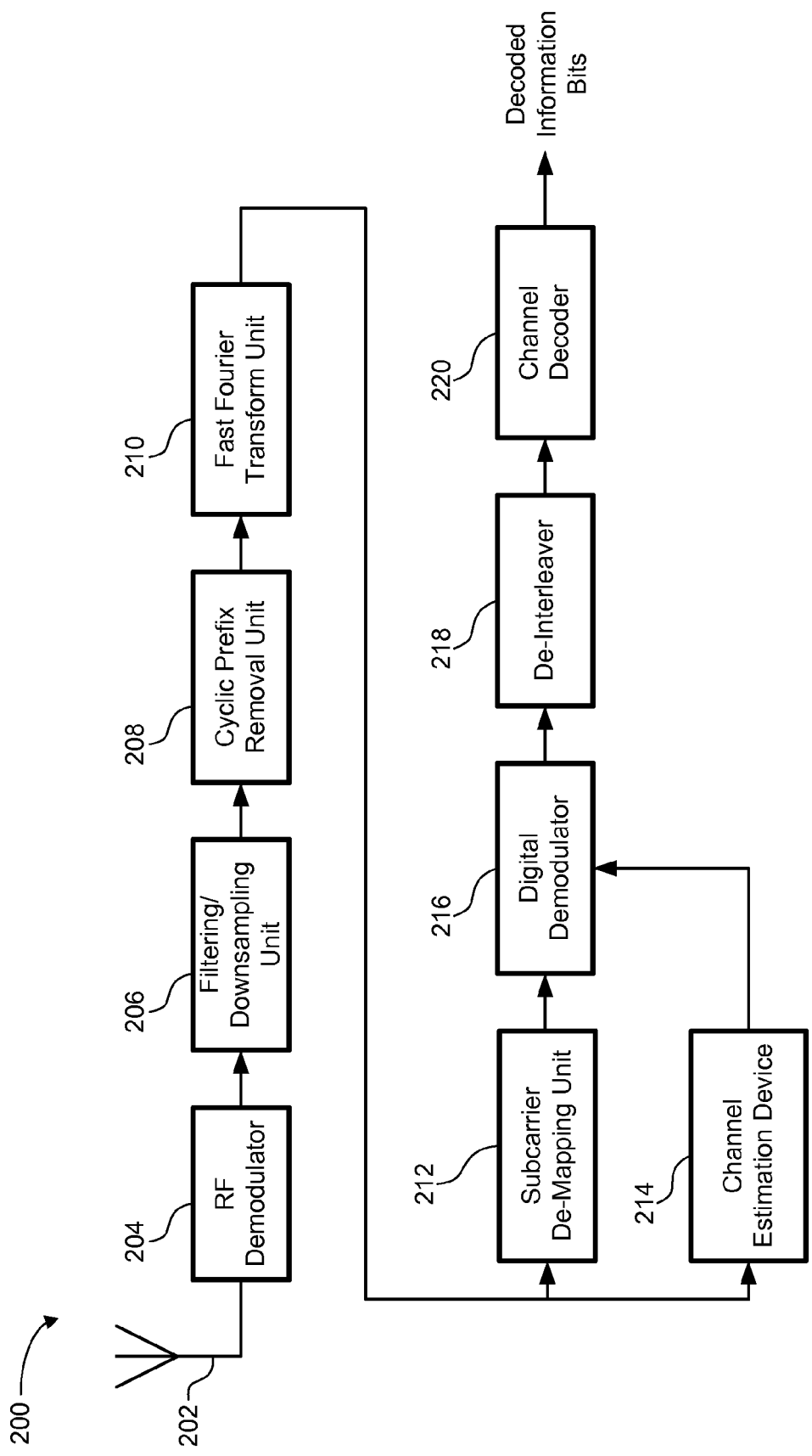
FIG. 2 is a block diagram of an OFDMA receiver in accordance with an embodiment of the invention.

Turning now to FIG. 2, an OFDMA receiver 200 in accordance with an embodiment of the invention is shown. The OFDMA receiver 200 is also part of an OFDMA wireless communication system. As an example, the OFDMA receiver 200 may be a component of a mobile station of an OFDMA wireless communication system.

As shown in FIG. 2, the OFDMA receiver 200 includes a receive antenna 202, an RF demodulator 204, a filtering/downsampling unit 206, a cyclic prefix removal unit 208, a FFT unit 210, a subcarrier de-mapping unit 212, a channel estimation device 214, a digital demodulator 216, a de-interleaver 218 and a channel decoder 220. The RF demodulator 204 is configured to demodulate the incoming RF signal received by the receive antenna 202. The filtering/downsampling unit 206 is configured to filter and down convert the RF-demodulated signal to a baseband signal. The cyclic prefix removal unit 208 is configured to remove the samples for the CP portion of the received signal. The FFT unit 210 is configured to apply FFT on N received samples per OFDMA symbol to generate N received subcarriers per OFDMA symbol in the frequency domain.

The subcarrier de-mapping unit 212 is configured to de-map the generated subcarriers to extract the subcarriers intended for this particular OFDMA receiver 200. The channel estimation device 214 is configured to compute frequency-domain channel estimates for the pilot subcarriers and then to interpolate the pilot channel estimates to derive frequency-domain channel estimates for the data subcarriers, as described in more detail below. The digital demodulator 216 is configured to demodulate the received modulation symbols in the data subcarriers using the frequency-domain channel estimates for the data subcarriers from the channel estimation device 214. The digital demodulator 216 compensates the signal attenuation and phase rotation for each subcarrier from the channel estimates. The demodulator output is hard or soft decision of encoded bits. The de-interleaver 218 is configured de-interleave the bit decisions, while the channel decoder 220 is configured to decode the de-interleaved bit decisions to extract the original information bits.

Although the components 102-116 of the OFDMA transmitter 100 and the components 204-220 of the OFDMA receiver 200 are illustrated and described herein as separate units, these components represent functional blocks, and consequently, may or may not be embodied in the form of physically separate units. Thus, some of these components may be combined into integrated modules. Alternatively, one or more of these components may be divided into two or more modules. Furthermore, these components may be implemented in any combination of hardware, firmware and/or software.

Figure 3:
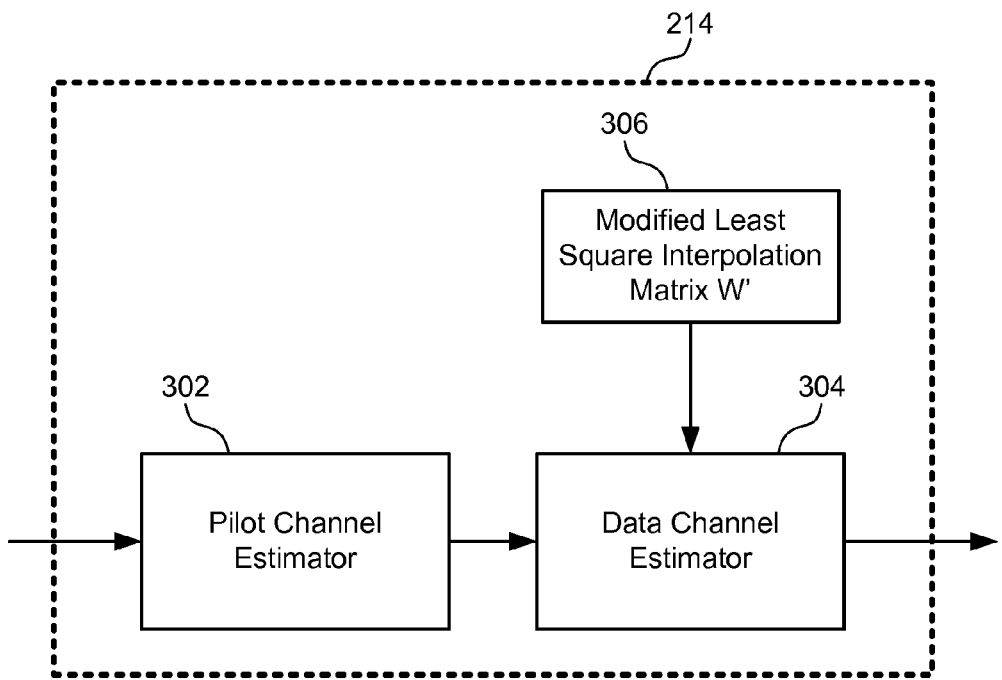
FIG. 3 is a block diagram of a channel estimation device of the OFDMA receiver in accordance with an embodiment of the invention.
Figure 4A:
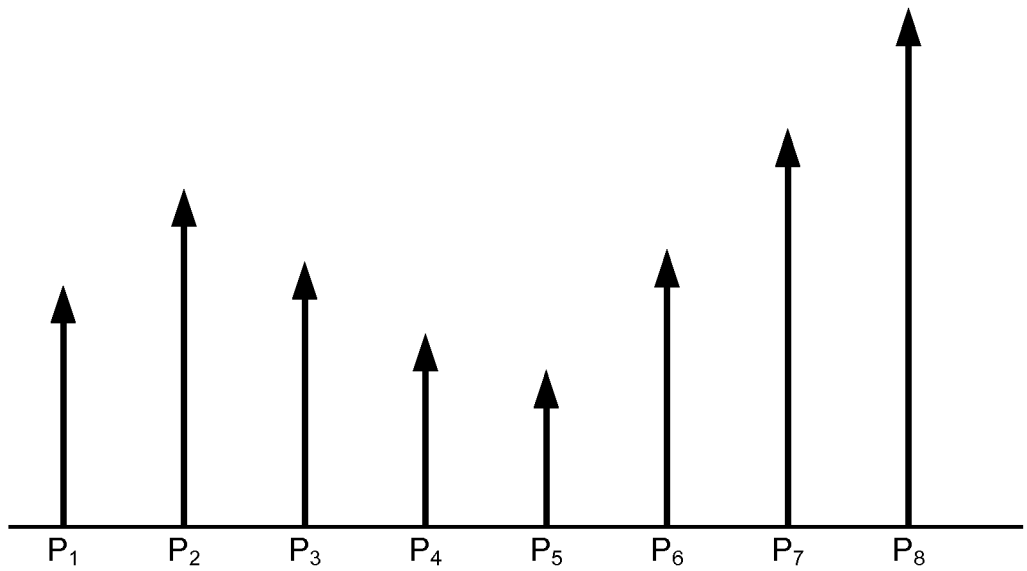
FIG. 4A illustrates estimated pilot channel values at pilot subcarrier locations for the pilot signals in accordance with an embodiment of the invention.
Figure 4B:
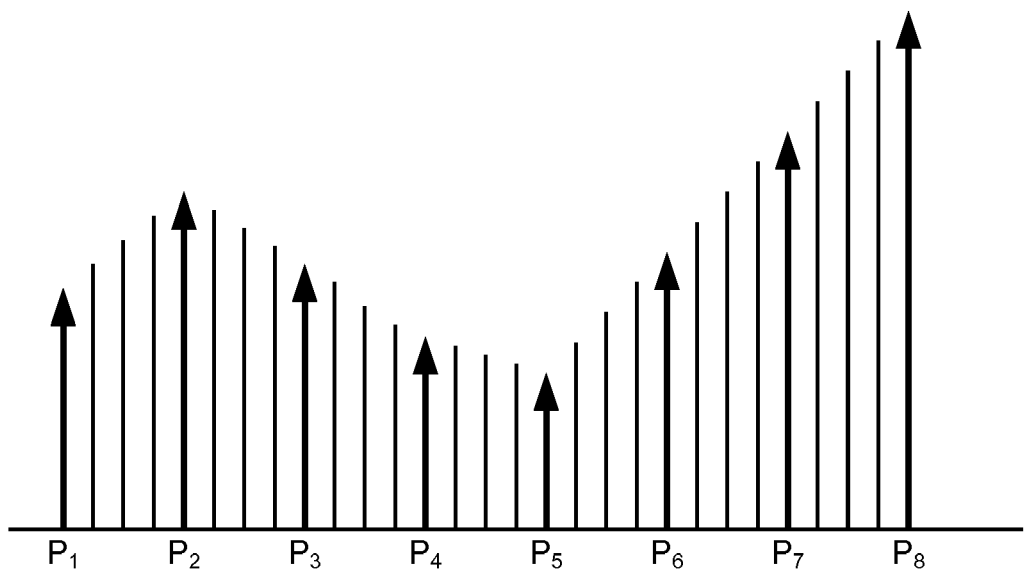
FIG. 4B illustrates estimated data channel values at the data subcarrier locations, which have been interpolated from the estimated pilot channel values, in accordance with an embodiment of the invention.

Turning now to FIG. 3, the channel estimation device 214 in accordance with an embodiment of the invention is shown. In this embodiment, the channel estimation device 214 includes a pilot channel estimator 302 and a data channel estimator 304. The pilot channel estimator 302 is configured to compute pilot channel estimates at pilot subcarrier locations $P_1, P_2 \ldots$ for the pilot signals, as illustrated in FIG. 4A. The pilot subcarrier locations are spaced such that a number of data subcarrier locations are situated between adjacent pilot subcarrier locations. As an example, three data subcarrier locations may be situated between adjacent pilot subcarrier locations. The data channel estimator 304 is configured to interpolate the pilot channel estimates to derive data channel estimates at data subcarriers for the data signals, as illustrated in FIG. 4B. The data channel estimates can then be used to compensate the signal attenuation and phase rotation for each data subcarrier.

The pilot channel estimator 302 uses the pilot subcarriers in the received signal to estimate pilot channel values at the locations of these pilot subcarriers. The pilot channel estimator 302 may use a known technique to derive the estimated pilot channel values at the pilot subcarrier locations. These estimated pilot channel values at the pilot subcarrier locations are illustrated in FIG. 4A. As an example, the pilot channel estimator 302 may use a pilot channel estimation scheme based on Least Square (LS) or Minimum Mean-Square (MMSE) to derive the estimated pilot channel values at the pilot subcarrier locations.

The data channel estimator 304 interpolates the estimated pilot channel values at the pilot subcarrier locations using a Least Square scheme with a statistical fading profile consideration to estimate data channel values at the locations of the data subcarriers. These estimated data channel values at the data subcarrier locations are illustrated in FIG. 4B. In an embodiment, the data channel estimator 304 applies a modified Least Square interpolation matrix W' 306 to the estimated pilot channel values from the pilot channel estimator 302 to derive the estimated data channel values. As described in more detail below, the modified Least Square interpolation matrix W' 306 includes Least Square interpolation coefficients, which have been modified in order to take into consideration a statistical fading profile of the channel with respect to subcarrier locations. In this embodiment, modified Least Square interpolation matrix W' 306 is generated in advance and stored in memory for use by the data channel estimator 304.

The mathematical basis of the modified Least Square interpolation matrix W' is now described. The mathematical relation between the pilot subcarriers and the data subcarriers can be described as follows:

$$h_{data} = Bh_{time} \quad (1)$$

$$h_{pilot} = Ah_{time} \quad (2)$$

where $h_{data}$, $h_{pilot}$ and $h_{time}$ are vectors, and A and B are matrices. The vectors $h_{pilot} = [H(n_{pilot, 1}), H(n_{pilot, 2}), \ldots,$ $H(n_{pilot, N_{pilot}})]^T$ and $h_{data}=[H(n_{data, 1}), H(n_{data, 2}), \ldots, H(n_{data, N_{data}})]^T$ are the frequency domain subcarrier channel response vectors for the pilot and data subcarriers, respectively, with $n_{pilot, i}$ and $n_{data, i}$ being the appropriate pilot and data subcarrier indices. Thus, the vector $h_{pilot}$ is an $N_{pilot} \times 1$ column vector and the vector $h_{data}$ is an $N_{data} \times 1$ column vector. The vector $h_{time}=[h(0), h(1), \ldots, h(K_{max}-1)]^T$ is the time-domain channel impulse response vector with h(i) being the channel impulse response at sampling time index i. The term $K_{max}$ represents the maximum delay spread of the channel impulse response in unit of the sampling time. Thus, the vector $h_{time}$ is a $K_{max} \times 1$ column vector. The matrices A and B are part of FFT matrix that relates the time domain impulse response to the frequency response. More specifically, the matrix A is an $N_{pilot} \times K_{max}$ matrix with $A_{xy}=\exp(-j2\pi n_{pilot, x}(y-1)/N)$ and the matrix B is an $N_{data} \times K_{max}$ matrix with $B_{xy}=\exp(-j2\pi n_{data, x}(y-1)/N)$, where N is the FFT size.

With an attempt to increase the interpolation accuracy, a Least Square interpolation scheme minimizes the squared error between the interpolated signal and the true value. A possible implementation shall be to find an interpolation coefficient matrix W such that $\hat{h}_{data}=Wh_{pilot}$ represents the interpolated channel responses for data subcarriers. The interpolation coefficient matrix W can be computed as:

$$W=BA^+, \quad (3)$$

where $A^+$ is the pseudo inverse of A such that $$A^+ = \begin{cases} (A^H A)^{-1} A^H & \text{if } K_{max} \leq N_{pilot} \\ A^H (AA^H)^{-1} & \text{otherwise.} \end{cases}$$

However, when the channel delay spread is large such that there are fewer equations than the unknowns (i.e., the number of pilot subcarriers for the interpolation is less than the number of multi-path fading components to be estimated), the interpolation coefficient matrix W does not produce the exact interpolation result. In fact, it can be shown that the mean squared interpolation error is minimized only if each multi-path component in $h_{time}$ is independent and identically distributed (i.i.d.).

The interpolation coefficient matrix W can be modified using statistical information of the channel fading profile to increase the accuracy of the Least Square interpolation. In one possible implementation, each multi-path component is assumed to have a variance that decays exponentially over time to account for the fact that the multi-path component that arrives later in time would have reduced strength due to longer propagation length. Such statistical fading profile can be modeled in the time domain channel impulse response as $$h_{time}=Gh'_{time} \quad (4)$$

where $h'_{time}$ is the uniform profile impulse response (i.e., each multi-path component is independent and identically distributed) and G is a diagonal channel profile matrix where each diagonal element or coefficient represents the relative path strength. In view of equations (1) through (3), a modified Least Square interpolation coefficient matrix W' can be found by defining modified matrices A' and B' as follows:

$$A'=AG \quad (5)$$

$$B'=BG \quad (6)$$

Thus, the modified Least Square interpolation coefficient matrix W' can be expressed as:

$$W'=BG(AG)^+ \quad (7)$$

This modified Least Square interpolation coefficient matrix W' will increase the interpolation accuracy for a channel fading environment with a corresponding profile since the interpolation coefficient matrix W' was designed to minimize the mean squared interpolation error for such scenario.

The above description only serves as an example of possible implementations to take into consideration the statistical information of the channel fading profile. In other implementations, the profile matrix G may not necessarily be a diagonal matrix and non-zero off-diagonal elements of the profile matrix G can model any correlation between multi-path components.

Figure 5:
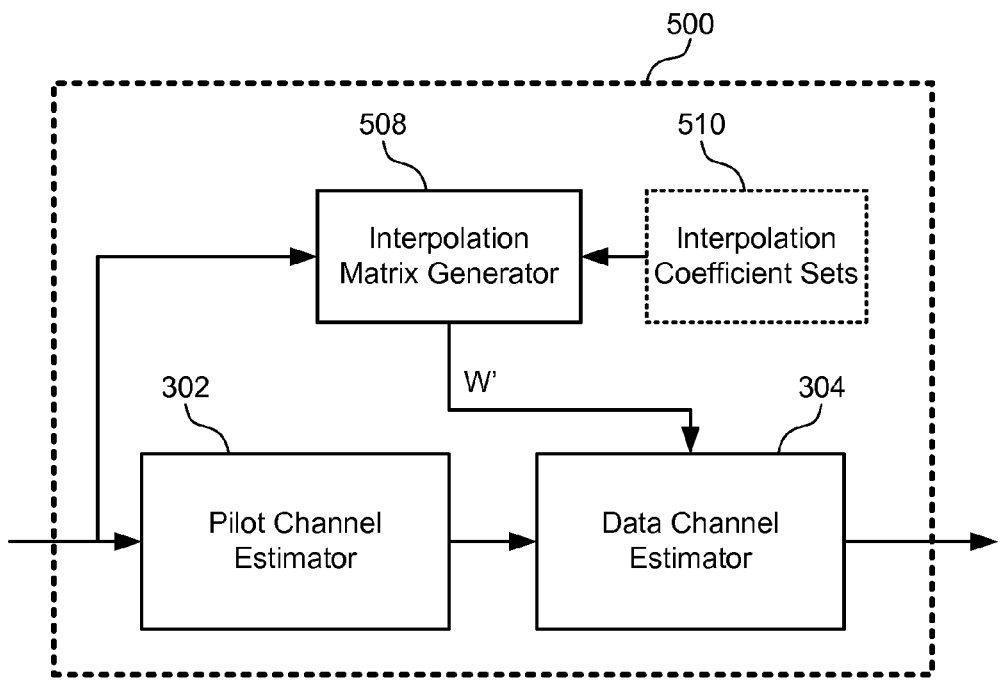
FIG. 5 is a block diagram of a channel estimation device in accordance with another embodiment of the invention.

Turning now to FIG. 5, a channel estimation device 500 for use in the OFDMA receiver 200 in accordance with another embodiment of the invention is shown. In this embodiment, the channel estimation device 500 includes the pilot channel estimator 302, the data channel estimator 304 and an interpolation matrix generator 508. The interpolation matrix generator 508 operates to provide the modified Least Square interpolation coefficient matrix W' to the pilot channel estimator 304.

In an embodiment, the interpolation matrix generator 508 is configured to compute the coefficients of the modified Least Square interpolation coefficient matrix W' using the received signal. In one possible implementation, the interpolation matrix generator 508 is configured to estimate statistical channel profile information from the preamble portion of a data frame, where the preamble portion contains known data sequence. Using the estimated statistical channel profile information, the interpolation matrix generator 508 generates the modified Least Square interpolation coefficient matrix W' using the equation (7).

In another embodiment, the interpolation matrix generator 508 is configured to adaptively select a set of coefficients for the modified Least Square interpolation coefficient matrix W' from a number of coefficient sets 510, which are pre-computed and stored in the receiver memory. The selected set of coefficients are then transmitted to the data channel estimator 304 as the modified Least Square interpolation coefficient matrix W' to be applied to the estimated pilot channel values to derive the estimated data channel values.

Although the channel estimation devices 214 and 500 have been described as being used in an OFDMA system, these channel estimation devices may be used in any OFDM-based wireless communication system. Thus, the channel estimation devices 214 and 500 can be used to estimate channel on any OFDM-based signals.

Figure 6:
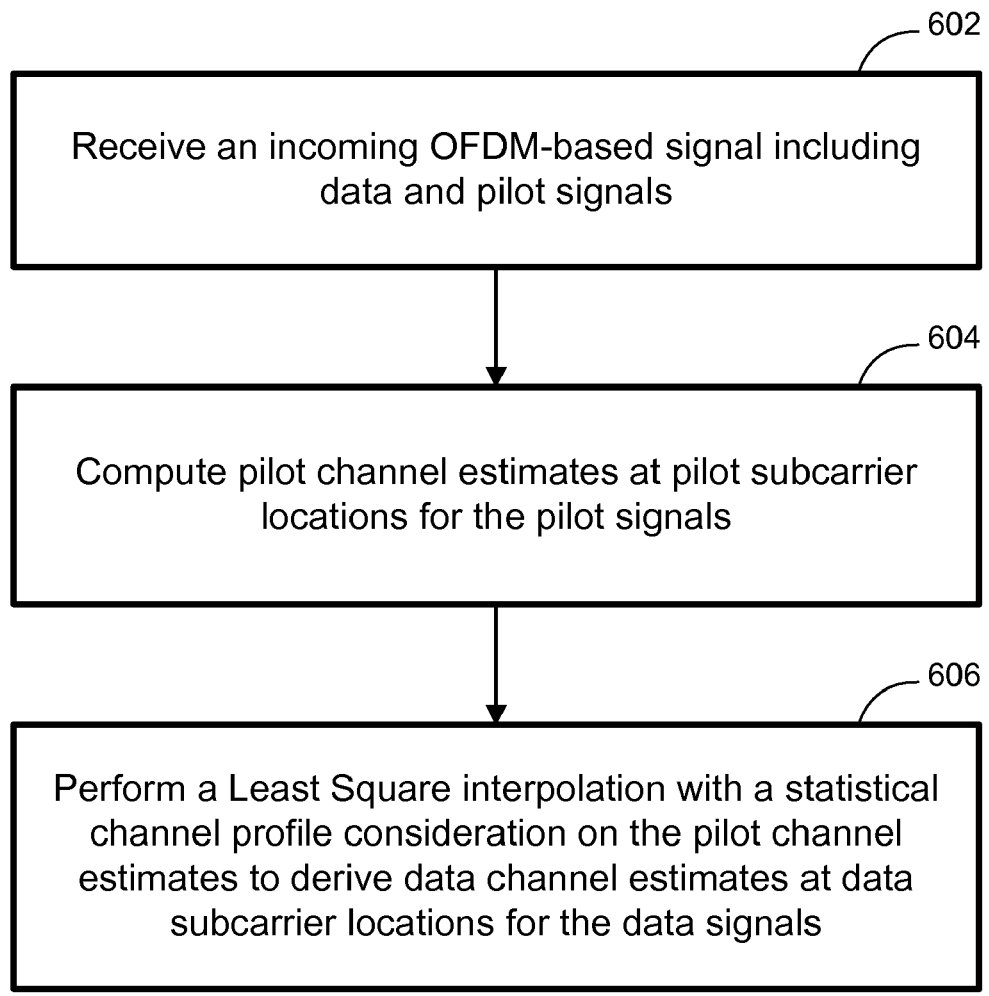
FIG. 6 is a process flow diagram of a method for performing channel estimation for an OFDM-based wireless communication system in accordance with an embodiment of the invention.

A method of performing channel estimation for an OFDM-based wireless communication system in accordance with an embodiment of the invention will be described with reference to a flow diagram of FIG. 6. At block 602, an incoming OFDM-based signal including data and pilot signals is received. Next, at block 604, pilot channel estimates at pilot subcarrier locations for the pilot signals are computed. Next, at block 606, a Least Square interpolation with a statistical channel profile consideration is performed on the pilot channel estimates to derive data channel estimates at data subcarrier locations for the data signals.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing channel estimation for an OFDM-based wireless communication system, said method comprising:

receiving an incoming OFDM-based signal including data and pilot signals;

computing pilot channel estimates at pilot subcarrier locations for said pilot signals; and performing a Least Square interpolation on said pilot channel estimates to derive data channel estimates at data subcarrier locations for said data signals, wherein said performing includes applying a modified Least Square interpolation coefficient matrix, said modified Least Square interpolation coefficient matrix including a channel profile matrix derived from statistical channel profile information, and wherein said modified Least Square interpolation coefficient matrix is defined generally as $$W' = X(Y)^+,$$

where X and Y are matrices based on part of a fast Fourier transform matrix that relates the time domain impulse response to the frequency response and $(Y)^+$ is a pseudo inverse of said Y.

2. The method of claim 1 wherein said performing includes selecting a coefficient set from a plurality of coefficient sets to derive said modified Least Square interpolation coefficient matrix.

3. The method of claim 1 wherein said channel profile matrix includes an assumption that each multi-path component has a variance that decays exponentially over time.

4. The method of claim 3 wherein said channel profile matrix is a diagonal matrix with diagonal coefficients that represent relative path strengths for different multi-path locations.

5. The method of claim 1 wherein said modified Least Square interpolation coefficient matrix is defined as $$W' = BG(AG)^+,$$

where A is a matrix with $A_{xy} = \exp(-j2\pi n_{pilot,x}(y-1)/N)$, B is a matrix with $B_{xy} = \exp(-j2\pi n_{data,x}(y-1)/N)$, G is said channel profile matrix, $(AG)^+$ is a pseudo inverse of said G multiplied by said A, and N is the fast Fourier transform size.

6. The method of claim 1 further comprising generating said modified Least Square interpolation coefficient matrix.

7. The method of claim 6 wherein said generating said modified Least Square interpolation coefficient matrix includes estimating said statistical channel profile information from a preamble portion of a data frame of said incoming OFDM-based signal.

8. A channel estimation device comprising:

a pilot channel estimator configured to compute pilot channel estimates at pilot subcarrier locations for pilot signals of an incoming OFDM-based signal; and a data channel estimator configured to perform a Least Square interpolation on said pilot channel estimates to derive data channel estimates at data subcarrier locations for data signals of said incoming OFDM-based signal, wherein said data channel estimator is configured to apply a modified Least Square interpolation coefficient matrix, said modified Least Square interpolation coefficient matrix including a channel profile matrix derived from statistical channel profile information, and wherein said modified Least Square interpolation coefficient matrix is defined generally as $$W' = X(Y)^+,$$

where X and Y are matrices based on part of a fast Fourier transform matrix that relates the time domain impulse response to the frequency response and $(Y)^+$ is a pseudo inverse of said Y.

9. The device of claim 8 further comprising an interpolation matrix generator configured to select a coefficient set from a plurality of coefficient sets to derive said modified Least Square interpolation coefficient matrix.

10. The device of claim 8 wherein said channel profile matrix includes an assumption that each multi-path component has a variance that decays exponentially over time.

11. The device of claim 10 wherein said channel profile matrix is a diagonal matrix with diagonal coefficients that represent relative path strengths for different multi-path locations.

12. The device of claim 8 wherein said modified Least Square interpolation coefficient matrix is defined as $$W' = BG(AG)^+,$$

where A is a matrix with $A_{xy} = \exp(-j2\pi n_{pilot,x}(y-1)/N)$, B is a matrix with $B_{xy} = \exp(-j2\pi n_{data,x}(y-1)/N)$, G is said channel profile matrix, $(AG)^+$ is a pseudo inverse of said G multiplied by said A, and N is the fast Fourier transform size.

13. The device of claim 8 further comprising an interpolation matrix generator configured to generate said modified Least Square interpolation coefficient matrix.

14. The device of claim 13 wherein said interpolation matrix generator is configured to estimate said statistical channel profile information from a preamble portion of a data frame of said incoming OFDM-based signal.

15. A method for performing channel estimation for an OFDM-based wireless communication system, said method comprising:

receiving an incoming OFDM-based signal including data and pilot signals;

computing pilot channel estimates at pilot subcarrier locations for said pilot signals; and performing a Least Square interpolation on said pilot channel estimates to derive data channel estimates at data subcarrier locations for said data signals, wherein said performing includes applying a modified Least Square interpolation coefficient matrix and selecting a coefficient set from a plurality of coefficient sets to derive said modified Least Square interpolation coefficient matrix, said modified Least Square interpolation coefficient matrix including a channel profile matrix derived from statistical channel profile information, said channel profile matrix being a diagonal matrix with diagonal coefficients that represent relative path strengths for different multi-path locations, each of said diagonal coefficients being a multi-path component that has a variance that decays exponentially over time.

16. A channel estimation device comprising:

a pilot channel estimator configured to compute pilot channel estimates at pilot subcarrier locations for pilot signals of an incoming OFDM-based signal;

a data channel estimator configured to perform a Least Square interpolation on said pilot channel estimates to derive data channel estimates at data subcarrier locations for data signals of said incoming OFDM-based signal, said data channel estimator being configured to apply a modified Least Square interpolation coefficient matrix, said modified Least Square interpolation coefficient matrix including a channel profile matrix derived from statistical channel profile information, said channel profile matrix being a diagonal matrix with diagonal coefficients that represent relative path strengths for different multi-path locations, each of said diagonal coefficients being a multi-path component that has a variance that decays exponentially over time; and an interpolation matrix generator configured to select a coefficient set from a plurality of coefficient sets to derive said modified Least Square interpolation coefficient matrix.

* * * * *